Sept. 6, 1955  H. G. DAVIS  2,716,984
FEMININE HYGIENE DISPENSER AND METHOD
Filed April 14, 1952  3 Sheets-Sheet 2

INVENTOR.
HAROLD G. DAVIS

Sept. 6, 1955    H. G. DAVIS    2,716,984
FEMININE HYGIENE DISPENSER AND METHOD
Filed April 14, 1952    3 Sheets-Sheet 3

INVENTOR.
HAROLD G. DAVIS
BY

United States Patent Office 2,716,984
Patented Sept. 6, 1955

2,716,984

FEMININE HYGIENE DISPENSER AND METHOD

Harold G. Davis, Denver, Colo.

Application April 14, 1952, Serial No. 282,099

13 Claims. (Cl. 128—225)

This invention relates to new and useful improvements in atomizers or dispensers and the like and an important object of the invention is to provide a dispenser which generates its own pressure at the will of the operator to eject its contents under variable control.

More particularly the invention contemplates the use of a chemical, in dosage form, in conjunction with liquid within the dispenser to form therein a gaseous pressure to eject a medicament, said chemical preferably being in the form of a tablet which is held in inactive storage from which it is readily released and which will form the exact concentrate for safe treatment when dissolved in the measured quantity of liquid held by the atomizer and will eject the concentrate in the form of a frothy foam under controllable pressure.

Another object of the invention is to provide means for temporarily separating the chemical and liquid so long as the dispenser is disposed in predetermined positions, but will mix when placed in other positions or shaken, so that the ingredients will not lose strength from standing or in mixture, and can be used immediately upon mixing to obtain maximum benefits and pressure head.

A further object of the invention is to provide the atomizer with operator means for controlling the amount of pressure and the quantity and concentrate of the mixture dispensed thereby.

A still further object of the invention is to provide a special form of medicated, gas forming tablet along with storage means within the atomizer which serves in effect as dosage measuring means for accurately controlling the concentrate of the medicament dispensed.

Another object of the invention is to provide a vaginal treating device by which the vaginal tract can be dilated to the desired degree and treated with a medicament in such form to be the most effective.

Other objects and advantages of the invention will become apparent during the course of the following description.

In the accompanying drawing forming a part of the description and wherein corresponding numerals are employed to designate like parts throughout the several views.

Figure 1:
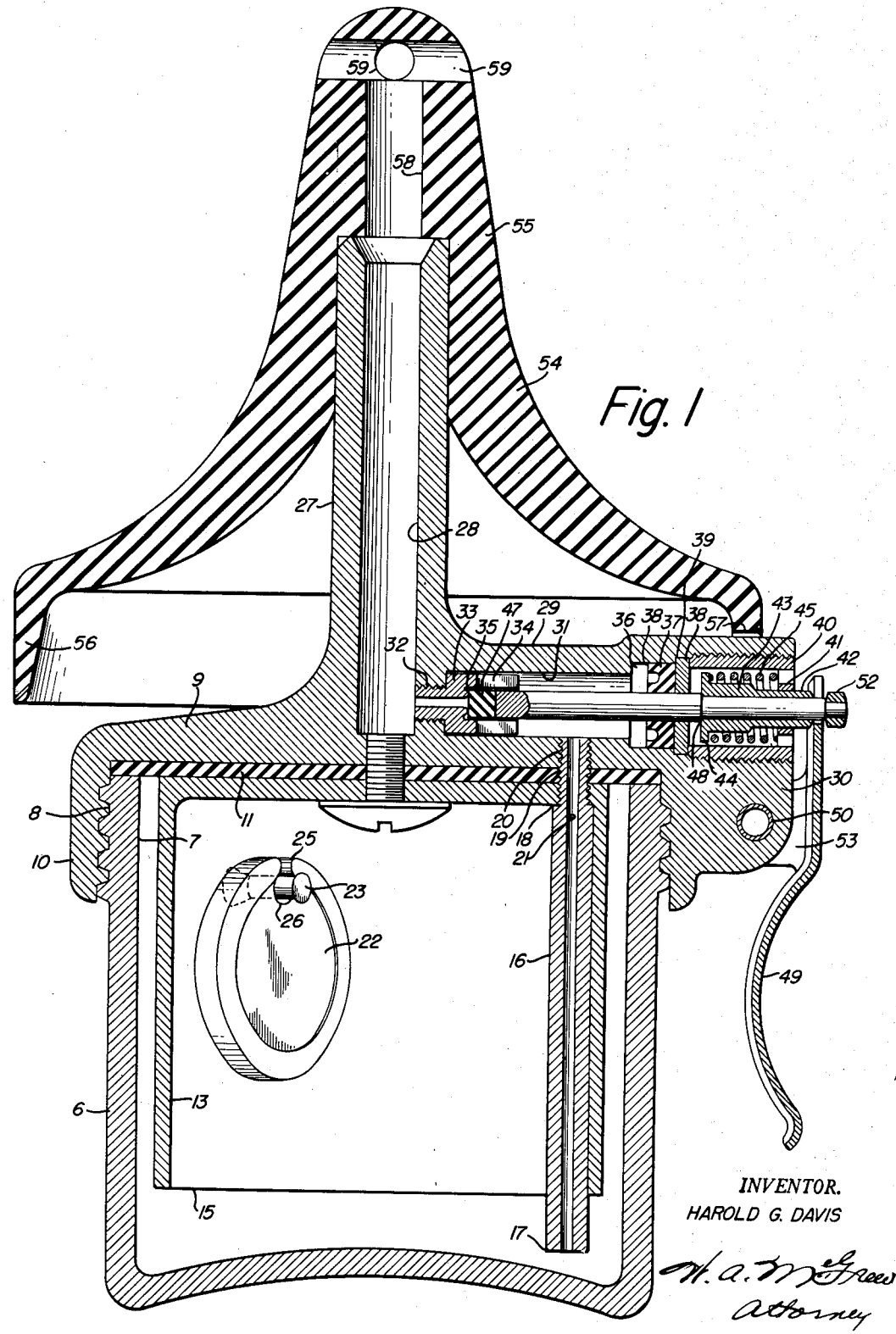
Fig. 1 is a vertical longitudinal section through the improved device.

Referring now more particularly to the drawing wherein for the purpose of illustration and not limitation is shown the preferred embodiment of the invention, the numeral 6 designates a cylindrical reservoir or container having an open end 7 terminating in an external screw thread 8 and adapted to contain a small quantity of water or medicament; approximately one ounce when the dispenser is used for treating the vaginal tract. Of course the container may be of any size or capacity best suited for the purpose for which it is to be used and may be made of glass, plastic or any other suitable material.

A cover or closure 9 is providel with a depending annular internally threaded flange 10 to screw onto the threads 8 of the container. Sealing means here shown in the form of a rubber disk 11 fits in the closure to form a pressure and liquid seal with the upper edge of the open end 7 of the reservoir. This sealing disk also forms a cushion for the closed top 12 of a cylindrical airtight driving bell-like member 13 or storage compartment secured to the closure 9 by a screw 14 passing through the center of the closed top 12 and sealing disk 11. The side walls of the member 13 are concentric with and spaced from the side walls of the reservoir, while the open lower end 15 of the member 13 is spaced from the bottom of the reservoir so that the level of the liquid in the latter will not normally enter the bell 13. A liquid discharge tube 16 extends vertically inside of the bell 13 against a side wall thereof and its lower end 17 extends below the open bottom 15 thereof to a point spaced slightly above the bottom of the reservoir. The upper portion of the tube 16 is provided with an annular shoulder 18 to abut the underside of the closed top 12 and above this shoulder, the tube is provided with an externally threaded end 19 to pass through aligned openings in the closed top 12 and the rubber disk 11 to seal the tube and fasten the same into a threaded opening 20 in the closure 9. The upper portion of this tube 16 slightly below the shoulder 18 may be provided with a radial aperture 21 communicating with the inside of the top of the bell member 13 and the longitudinal bore through the tube. This aperture when used, may be made of variable sizes to vary or proportion the discharge of gas and liquid through the tube 16 as desired, or plugs with various sized perforations may be used in the aperture 21.

In order to support a chemical gas creating medicament in the form of an effervescing soluble tablet or wafer 22 in dry powder form and of proper dosage within the bell 13 and out of contact with a predetermined amount of liquid in the reservoir 6 until the dispenser is to be used, a tablet supporting pin 23 is secured to the side wall of the bell 13. This pin extends radially inward from the upper portion of the wall to support the tablet 22 well above the liquid level in the reservoir until its dissolution in the liquid is desired just prior to its use, whereby the full strength of the medicament is assured. The headed supporting pin or peg 23 is of such length that it will support only one tablet at a time, but if more than one tablet is to form the desired dosage, the pin can be made of such length as to accommodate the required number of tablets. The tablet 22 is preferably in the form of a disk with a thickened rim 24 extending from one side thereof and is molded with a slot 25 extending radially through the rim of the tablet and into its body to terminate in a circular opening 26 larger in diameter than the pin 23. The slot 25 is a trifle narrower than the diameter of the pin 23 so that its edges will suspend the tablet from the pin 23 after the tablet is moved lengthwise to thread the pin through the opening 26. However, when the reservoir is shaken or tilted once, the tablet will be moistend by the splashing of the liquid up into the bell 13 and will immediately cause the edges of the slot 25 to rapidly disintegrate and permit the tablet to fall from the pin 23 and drop into the liquid below to dissolve. These tablets or wafers 22 are preferably formed of a composition of sodium bicarbonate and tartaric acid or other chemicals, which when wetted will evolve carbon dioxide gas and a medicament in foamy or bubbly form. The gas will create a sufficient pressure head in the bell 13 and reservoir 6 to force the foamy medicated mixture from the reservoir up through the discharge tube 16 and a controlled amount of gas through the aperture 21 into this tube.

The closure or cap 9 is provided with an integral centrally located upstanding elongated outlet tube 27 having a bore 28 extending longitudinally thereof to terminate and be closed at its lower end by the screw 14. Formed integrally on the closure cap 9 and integrally with the base of the tube 27 is a control valve housing 29 extending radially beyond the periphery of the closure and terminating in a depending pivot lug 30 joined integrally to the flange 10. This valve housing is provided with a circular bore 31 extending longitudinally thereof to communicate with the threaded upper end of the tube 16. The inner end of the bore 31 is reduced and screw threaded as at 32 to communicate with the bore 28 of the discharge tube 28 and to receive a removable valve seat member 33 having at one end a nipple threaded into the threaded portion 32 of the bore, and having at its other end a slotted valve stem guide 34 and a recessed valve seat 35. This bore 31 at its intermediate portion is provided with a slightly enlarged chamber 36 to receive a rubber gasket 37 having a skirt 38 facing inwardly and forced against the walls of the chamber 36 by pressure within the bore 31 to render the latter air-tight. The gasket 37 is backed by a packing gland washer 38 of metal or rubber composition held against a shoulder 39 by abutment of a packing gland sleeve 40 threaded into the enlarged threaded outer end of the bore 31. The outer end of the sleeve 40 is provided with a spider ring 41 which forms a guide for the outer reduced end 42 of a spring compressing spool 43. The inner end of the spool is provided with an annular flange 44 forming an abutment for one end of a compression spring 45 which has its outer end abutting the spider of the ring 41. A valve stem 46 is slidably mounted in the gasket 37 and valve seat guide 34 and has its inner end provided with a cylindrical rubber valve head 47 adapted to be normally pressed upon its seat 35 by the spring 45 and spool 43 operating against a shoulder 48 formed on the valve stem by its reduced outer end upon which the spool is slidably mounted.

In order to slide the valve stem 46 and spool 43 outwardly to unseat the valve head 47 and compress the spring 45, a hand lever 49 is pivoted to the lug 30 of the closure by a pivot 50 with its working end forked as at 51 to straddle the projecting end of the valve stem. A nut or button 52 is fastened to the outer end of the valve stem 46 to form an abutment for the forked end of the lever 49, to cause the lever to slide the valve stem outwardly to open the valve when the curved handle end of lever 49 is pressed toward the reservoir 6. The pivoting of this lever is preferably provided by forming the lever with a pair of pivot ears 53 straddling the lug 30 through which the pivot 50 is extended.

Figure 2:
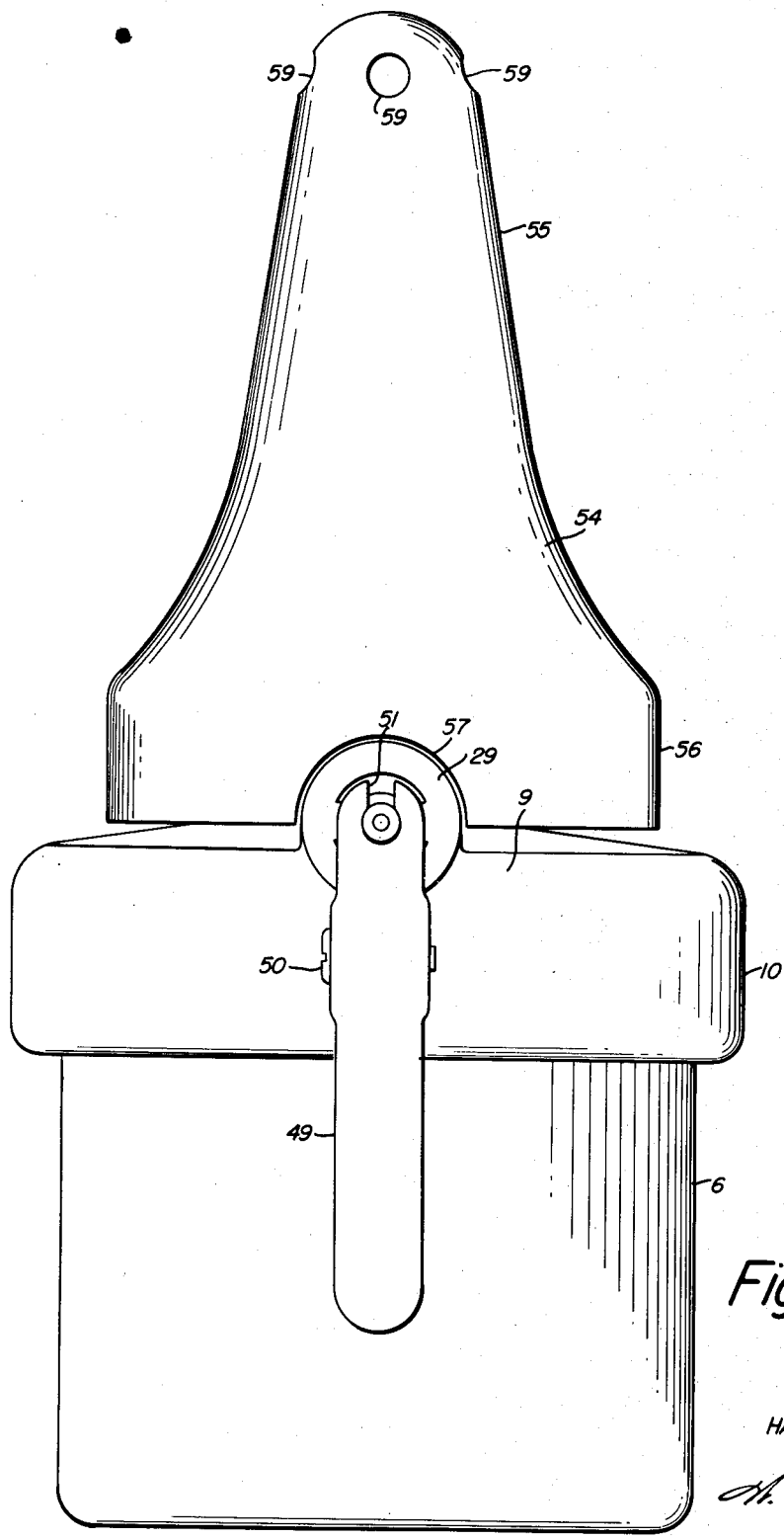
Fig. 2 is a side elevation of the device looking toward the side thereof possessing the operating lever.
Figure 3:
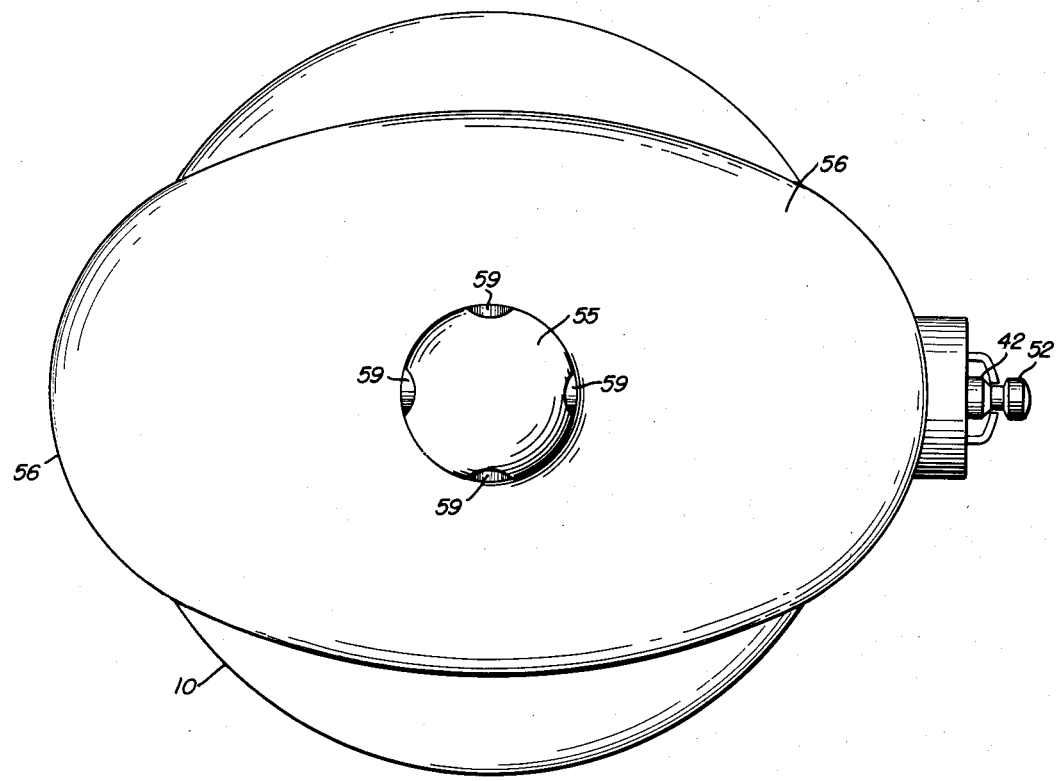
Fig. 3 is a top elevation of the device showing the shape of the nozzle.
Figure 4:
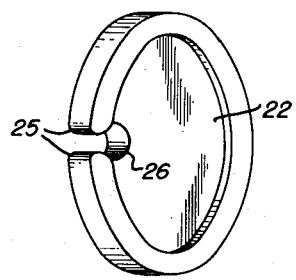
Fig. 4 is an enlarged perspective view of the form and shape of the soluble dosage tablet.

Various application nozzles can be associated with the discharge tube 27, and a preferred type is a vaginal nozzle 54 composed of soft rubber having a tapered tubular portion 55 slipped over the tube as shown in Fig. 1 and tapering outwardly into an oval inverted cup-shaped base 56 to fit the organ snugly. This base is spaced from the closure as shown to allow flexibility and is provided with an arcuate notch 57 to have clearance about the valve housing 29 as best shown in Fig. 2. The tubular end of the nozzle 55 is provided with a longitudinal bore 58 terminating in radial ducts 59 near the convex end of the nozzle. In the use of this form of dispenser when loaded with liquid and the tablet 22 suspended on peg 23, the container 6 is tilted or shaken to cause the liquid in the container to enter or splash within the bell 13 and upon the tablet or wafer. This moisture will cause the edges of the slot 25 to quickly disintegrate, allowing the tablet to fall into the liquid below to dissolve its medicament in the liquid and generate a gas which fills the bell 13 and container 6. This pressure head will cause the liquid which is converted into the form of foam to be forced up through the tube 16 into the bore 31 ready to be ejected under very light pressure through the valve seat 33 and into the nozzle 54 whenever the valve stem is manually operated by the hand lever 49. With the medicament freshly mixed, the nozzle 54 is entered into the vaginal tract until the oval base 56 is pressed firmly against the female organ. The hand lever 49 is then pressed to move the valve head 47 away from its seat 33 to allow the foamy medicament to enter the vaginal tract with sufficient gas pressure passing through the aperture 21 into the tube 16 and through the valve to enter the nozzle and vaginal tract to slightly dilate the walls thereof and thus achieve thorough cleansing and disinfection of the tract with a minimum quantity of liquid and without flushing away the bacterial flora present.

If the aperture 21 in the tube 16 is not provided, the entire contents of the container will be dispensed from the bottom of the tube 16. However, when this aperture 21 is used, excess gas is created where a high ratio gas to liquid dispensed is desirable. This aperture also creates what may be termed a bubble formation in the container which is desirable in connection with many treatments given by the dispenser. By varying the quantity of liquid placed in the container, and by varying the size or ingredients used in the gas-evolving tablet 22, the proportion of gas to liquid dispensed may be varied and controlled. Also by pressing the operating lever 49 to various degrees, the valve 47 will be moved proportionately to permit the desired quantity of medicament to be ejected from the discharge tube 27.

It will be understood that the device can be easily replenished with liquid and another tablet by simply removing the closure 9, which will lift with it the bell 13 and entire mechanism, so that the proper amount of liquid can be placed in the container and a single tablet 22 can be threaded upon the peg 23 by threading the circular opening 26 in the tablet over the peg. When the closure is replaced upon the container, the tablet will be retained in storage above the liquid level due to the bell 13 preventing such level from rising therein, except when tilted or shaken.

It will of course be understood that this dispenser has uses other than in the medicinal field and may be used in dispensing deodorants, foods such as whipped cream, and the like, by substituting said deodorant or food for the liquid in the container and employing a harmless chemical tablet which will dissolve and create enough gas within the container when shaken and moistened by the contents to cause discharge of the deodorant or food therefrom.

I claim:

1. A dispenser comprising the combination of a container adapted to contain and dispense a substance, a removable cover for said container, a separate storage compartment in said container and extending into the container for substantially its entire depth, said storage compartment being attached to and removable with said cover, and a soluble gas-creating substance in said compartment adapted to contact said container substance only when said container is operated whereby to cause said gas creating substance to contact said container substance and create sufficient gas pressure to dispense the substance from the container.

2. A dispenser comprising the combination of a container adapted to contain and dispense a substance, a closure for the container having means to dispense said substance, an inverted gas-tight bell carried by said closure having a closed upper end and having an open lower end spaced above the bottom of said container and adapted to be submerged in said substance, said bell being removable with the closure and means within said bell for suspendingly supporting a gas-creating substance out of contact with said substance except when said container is operated to cause said two substances to contact and create sufficient gas pressure to dispense the substance from the container.

3. A dispenser comprising the combination of a container adapted to contain and dispense a substance, a closure for the container having means to dispense said substance, an inverted gas-tight bell attached to said closure and removable with it and having a closed upper end and an open lower end spaced above the bottom of said container and adapted to be submerged in said substance, and a peg extending radially inward from an upright wall of said bell to support a gas-evolving tablet out of contact with said substance except when said container is operated to cause said substance to contact said tablet and create sufficient gas pressure to dispense the substance from the container.

4. A dispenser comprising the combination of a container adapted to contain and dispense a substance, a closure for the container having means to dispense said substance, an inverted gas-tight bell attached to and removable with said closure and having a closed top end, an open bottom end spaced above the base of said container and adapted to be submerged in said substance, and a peg extending radially inward from the upright wall of said bell to support a gas-evolving tablet out of contact with said substance except when said container is operated to cause said substance to contact said tablet and create sufficient gas pressure to dispense the substance from the container, a gas-evolving tablet on said peg, said table having a radial slot narrower than the peg by which said tablet is supported upon said peg and said slot terminating in an opening by which said tablet is threaded upon said peg.

5. A gas-evolving tablet of wafer-like form having a slot extending into an edge thereof and terminating in an opening in the body of the tablet wider than said slot.

6. Means for producing gas in a container having a gas-tight compartment therein, a peg extending inwardly from an upright wall of said compartment, and a gas-evolving tablet supported upon said peg and adapted to be moistened to start the gas-evolving action.

7. Means for producing gas in a container having a gas-tight compartment therein, a peg extending horizontally inwardly from an upright wall of said compartment, and a gas-evolving tablet having a slot extending into an edge thereof, said slot being narrower than said peg and terminating in an opening in the body of said tablet wider than the diameter of said peg.

8. Means for producing gas in a liquid container having a removable closure, a gas-tight bell attached to, depending from and removable with said closure and having an open lower end adapted to be submerged beneath the level of the liquid in said container, means within said bell for normally supporting a gas-evolving substance above the liquid level, and said substance being supported by said means and adapted to evolve gas when subjected to the liquid in said container.

9. A dispenser comprising a container adapted to contain a liquid, a closure for said container having a discharge tube extending into said container to a point adjacent the bottom thereof, a gas-tight bell carried by and removable with said closure and having a lower open end spaced above the bottom of said container and the lower end of said discharge tube, means within said bell for normally supporting a gas-evolving substance therein above the level of the liquid in the said container, and said substance being adapted to evolve gas when subjected to the liquid in said container to eject the contents through said discharge tube.

10. A dispenser according to claim 9 and wherein said discharge tube extends through the bell and has an opening therein communicating the top of the bell interior with the passageway of discharge tube whereby a portion of the gas evolved in the upper end of the bell can escape into the discharge tube.

11. A dispenser comprising a container adapted to contain liquid, a closure for said container having a discharge outlet, said closure having a valve control assembly for controlling said outlet, a gas-tight bell carried by said closure and having a lower open end spaced above the bottom of said container, means in said bell for supporting a gas-evolving substance out of contact with the liquid in said container while the container is maintained in upright position, said substance being adapted to be brought into contact with the liquid upon tipping or shaking of the container to initiate its gas-evolving action, said closure, valve control assembly and said gas-tight bell being capable of removal as a unit from said container.

12. An atomizer comprising a container for liquid, said container being normally held in an upright position and having an opening at its top communicating with a discharge nozzle, means including a control assembly for closing said opening, said assembly including a conduit opening into the lower portion of said container and having a discharge outlet exteriorly of the same, said assembly also including a downwardly opening enclosure within said container forming an air pocket for receiving a gas-evolving tablet, said control assembly, conduit and downwardly opening enclosure being removable as a unit from the container, a member disposed within the enclosure for supporting said gas-evolving tablet normally in upright position and out of contact with the liquid in the container while said container is maintained in its upright position, said tablet being adapted to be brought into contact with the liquid upon tipping of the container to initiate the gas-evolving action, and a manually controlled valve in said assembly for controlling the discharge of liquid and gas under pressure from said container.

13. Structure according to claim 12, wherein the discharge nozzle is provided with a soft rubber organ-engaging tubular member tapering at its base into an oval-like shield adapted to fit said organ snugly to seal the mouth thereof.

References Cited in the file of this patent
UNITED STATES PATENTS

| 962,313 | Champlin | June 21, 1910 |
| 1,681,320 | Bergl et al. | Aug. 21, 1928 |
| 1,719,163 | Bergl | July 2, 1929 |
| 2,566,823 | Cariffe | Sept. 4, 1951 |